(12) United States Patent
Terra et al.

(10) Patent No.: US 11,062,411 B2
(45) Date of Patent: Jul. 13, 2021

(54) STUDENT RETENTION SYSTEM

(71) Applicant: Oracle International Corporation, Redwood Shores, CA (US)

(72) Inventors: Egidio Loch Terra, San Mateo, CA (US); James Thomas McKendree, Elizabeth, CO (US); Catherine H. M. Kuo, Danville, CA (US); Paz Centeno, Delray Beach, FL (US); Boonchanh Oupaxay, Mountain House, CA (US); Gary Paul Allen, Petaluma, CA (US); Rondy C. Ng, Redwood Shores, CA (US); Vivian Wei Wong, Danville, CA (US); Susan Jane Beidler, Oakland, CA (US); David Anthony Madril, Denver, CO (US); Richard Lee Krenek, Pleasanton, CA (US); Alexander Y. Rukhotskiy, Boulder, CO (US)

(73) Assignee: Oracle International Corporation, Redwood Shores (CA)

( * ) Notice: Subject to any disclaimer, the term of this patent is extended or adjusted under 35 U.S.C. 154(b) by 420 days.

(21) Appl. No.: 15/974,552

(22) Filed: May 8, 2018

(65) Prior Publication Data
US 2019/0102851 A1    Apr. 4, 2019

Related U.S. Application Data

(60) Provisional application No. 62/566,360, filed on Sep. 30, 2017.

(51) Int. Cl.
*G06Q 10/10*    (2012.01)
*G06Q 30/02*    (2012.01)
(Continued)

(52) U.S. Cl.
CPC ....... *G06Q 50/205* (2013.01); *G06Q 10/0635* (2013.01); *G06Q 10/1095* (2013.01); *G06F 3/04842* (2013.01)

(58) Field of Classification Search
CPC ............. G06Q 50/205; G06Q 50/2053; G06Q 10/1095; G06Q 10/0635; G06F 3/04842
(Continued)

(56) References Cited

U.S. PATENT DOCUMENTS

| 5,727,950 A | 3/1998 | Cook et al. |
| 6,347,333 B2 | 2/2002 | Eisendrath et al. |

(Continued)

FOREIGN PATENT DOCUMENTS

| WO | 97/44766 A1 | 11/1997 |
| WO | 01/82150 A2 | 11/2001 |

(Continued)

OTHER PUBLICATIONS

Aguiar, E., Identifying students at risk and beyond: A machine learning approach (Order No. 3733723). Available from ProQuest Dissertations and Theses Professional. (1749024112), Jul. 2015. (Year: 2015).*

(Continued)

*Primary Examiner* — Jonathan P Ouellette
(74) *Attorney, Agent, or Firm* — Invoke (57) ABSTRACT

Operations include identifying students at risk of dropping out or transferring from an academic institution. A student risk analyzer determines a risk score for a student, which may be used to determine whether the student is at-risk. The risk score may be based on a combination of factors. As an example, the risk score may be based on a similarity between (a) attributes of the student and (b) attributes of students that have previously dropped out or transferred to other institutions. A student retention interface displays risk (Continued)

information for students in aggregate form or individual form. The interface may display student information in a student-population view comprising aggregate student information. The interface may display a risk-category view comprising a subset of students. The interface may display an individual-profile view comprising detailed information about a particular student. The interface may allow for drill-down navigation between the views.

19 Claims, 6 Drawing Sheets

(51) Int. Cl.
*G06Q 90/00* (2006.01)
*G06Q 50/20* (2012.01)
*G06Q 10/06* (2012.01)
*G06F 3/0484* (2013.01)

(58) Field of Classification Search
USPC ................................ 705/1.1–912, 326, 327
See application file for complete search history.

(56) References Cited

U.S. PATENT DOCUMENTS

| | | | |
|---|---|---|---|
| 6,427,063 B1 | 7/2002 | Cook et al. | |
| 7,882,041 B2* | 2/2011 | Gibbons | G06Q 50/2053 |
| | | | 705/326 |
| 8,412,736 B1* | 4/2013 | Arnold | G06F 16/2465 |
| | | | 707/776 |
| 8,620,831 B1 | 12/2013 | Adams | |
| 8,764,454 B1 | 7/2014 | Turner | |
| 9,299,266 B2* | 3/2016 | Crawford | G09B 5/10 |
| 9,824,603 B2* | 11/2017 | Brooke | G09B 7/02 |
| 9,940,606 B2 | 4/2018 | Madhavan et al. | |
| 10,229,100 B1 | 3/2019 | Lesner et al. | |
| 10,607,298 B1 | 3/2020 | Hanekamp et al. | |
| 2004/0009462 A1 | 1/2004 | McElwrath | |
| 2004/0138913 A1 | 7/2004 | Guerra | |
| 2004/0161728 A1 | 8/2004 | Benevento et al. | |
| 2004/0167786 A1 | 8/2004 | Grace | |
| 2004/0181749 A1 | 9/2004 | Chellapilla et al. | |
| 2005/0198563 A1 | 9/2005 | Kristjansson | |
| 2006/0252021 A1 | 11/2006 | Watkins et al. | |
| 2006/0265258 A1 | 11/2006 | Powell et al. | |
| 2009/0035733 A1 | 2/2009 | Meitar et al. | |
| 2009/0081629 A1 | 3/2009 | Billmyer et al. | |
| 2009/0083638 A1 | 3/2009 | Gupta | |
| 2009/0197234 A1 | 8/2009 | Creamer et al. | |
| 2010/0009330 A1* | 1/2010 | Yaskin | G09B 7/00 |
| | | | 434/350 |
| 2010/0009331 A1* | 1/2010 | Yaskin | G09B 7/00 |
| | | | 434/362 |
| 2010/0009332 A1* | 1/2010 | Yaskin | G09B 7/00 |
| | | | 434/362 |
| 2010/0223194 A1 | 9/2010 | Adams | |
| 2011/0270684 A1 | 11/2011 | Holtzman | |
| 2012/0233083 A1* | 9/2012 | Strodtman | G06Q 50/20 |
| | | | 705/326 |
| 2012/0233084 A1* | 9/2012 | Sardonis | G06Q 10/06 |
| | | | 705/326 |
| 2012/0233108 A1* | 9/2012 | Stober | G06Q 10/06 |
| | | | 706/50 |
| 2013/0011821 A1 | 1/2013 | Denley | |
| 2014/0052663 A1 | 2/2014 | Kelley et al. | |
| 2014/0074896 A1* | 3/2014 | Bushman | G06Q 50/20 |
| | | | 707/805 |
| 2014/0188442 A1* | 7/2014 | Zelenka | G06Q 50/20 |
| | | | 703/2 |
| 2014/0195549 A1 | 7/2014 | Ahn et al. | |
| 2014/0205987 A1 | 7/2014 | Habermehl et al. | |
| 2014/0279620 A1 | 9/2014 | Lillquist et al. | |
| 2015/0066559 A1 | 3/2015 | Brouwer | |
| 2015/0134556 A1 | 5/2015 | Spinner et al. | |
| 2015/0149379 A1 | 5/2015 | Dearmon | |
| 2015/0205777 A1 | 7/2015 | Campanelli et al. | |
| 2015/0220880 A1 | 8/2015 | Maipady et al. | |
| 2015/0248739 A1 | 9/2015 | Schulman et al. | |
| 2015/0317604 A1 | 11/2015 | Bubna et al. | |
| 2016/0071424 A1 | 3/2016 | Harney et al. | |
| 2016/0140679 A1 | 5/2016 | Segal et al. | |
| 2016/0275634 A1 | 9/2016 | Singh et al. | |
| 2016/0371805 A1 | 12/2016 | Knotts et al. | |
| 2017/0004453 A1 | 1/2017 | Lin et al. | |
| 2017/0154308 A1 | 6/2017 | Duerr et al. | |
| 2017/0256172 A1 | 9/2017 | Kil et al. | |
| 2017/0316528 A1 | 11/2017 | Willcox et al. | |
| 2017/0365023 A1 | 12/2017 | Cox et al. | |
| 2018/0052919 A1 | 2/2018 | Feldman | |
| 2018/0189911 A1 | 7/2018 | Al-Sulaiman et al. | |
| 2018/0276205 A1 | 9/2018 | Auger | |
| 2018/0293679 A1 | 10/2018 | Bai et al. | |
| 2018/0293905 A1* | 10/2018 | Benz | G06N 5/003 |
| 2018/0350016 A1 | 12/2018 | Ward | |
| 2018/0366021 A1* | 12/2018 | Zertuche | G06F 40/40 |
| 2019/0080628 A1* | 3/2019 | Olsen | G09B 5/00 |

FOREIGN PATENT DOCUMENTS

| | | | |
|---|---|---|---|
| WO | 2003/100560 A2 | 12/2003 | |
| WO | 2004/023329 A1 | 3/2004 | |
| WO | WO-2013066868 A1 * | 5/2013 | ............ G06Q 30/00 |

OTHER PUBLICATIONS

Hurwitz, "The impact of legacy status on undergraduate admissions at elite colleges and universities", 2009, retrieved from https://scholar.harvard.edu/files/btl/files/michaeLhurwitz_-_qp_12-12-09.pdf (Year: 2009).

Murtaugh, Paul A., Leslie D. Burns, and Jill Schuster. "Predicting the retention of university students" Research in higher education 403 (1999): 355-371. (Year: 1999).

Thomas Lux, et al., "Applications of Supervised Learning Techniques on Undergraduate Admissions Data", 2016, retrieved from https://dl.acm.org/doi/pdf/10.1145/2903150.2911717 (Year: 2016).

Waters et al., "GRADE: Machine Learning Support for Graduate Admissions", 2013, Proceedings of the Twenty-Fifth Innovative Applications of Artificial Intelligence Conference (Year: 2013).

Maryalene LaPonsie, "The High School Student's Guide College Admissions", retrieved from https://web.archive.org/web/20161013154233/https://www.accreditedschoolsonline.org/resources/college-admissions-guide/; www.accreditedschoolsonline.org (Year: 2016).

Tristan Denley, Degree Compass: A Course Recommendation System, EDUCASE, Nov. 23, 2017.

Grewal DS, Kaur K (2016) Developing an Intelligent Recommendation System for Course Selection by Students for Graduate Courses. Bus Eco J 7209. doi:10.4172/2151-6219.1000209.

Even your academic advisor might one day be a robot, retrieved from https://www.engadget.com/2016/01/14/your-academic-advisor-might-one-day-be-a-robot/.

Chatbot helps students choose courses, retrieved from http://www.bbc.com/news/technology-40960426.

Al-Badarenah and Alsakran, An Automated Recommender System for Course Selection, International Journal of Advanced Computer Science and Applications, vol. 7, No. 3, pp. 166-175, 2016.

Aasheim et al., Knowledge and skill requirement for entry level IT workers, Journal of Information Systems Education, vol. 20(3), pp. 349-356 (Year: 2009).

Tsai et al., "Ontology-Mediated Integration of Intranet Web Services," Computer, p. 63-71, copyright 2003 IEEE. (Year: 2003).

Aher, Sunita B., and L. M. R. J. Lobo. "Combination of machine learning algorithms for recommendation of courses in E-Learning System based on historical data." Knowledge-Based Systems 51 (2013): 1-14. (Year: 2013).

(56) References Cited

OTHER PUBLICATIONS

Brzozowski, Mike, etal. "groupTime: preference based group scheduling." Proceedings of the SIGCHI conference on Human Factors in computing systems. 2006. (Year: 2006).

Liao, Soohyun Nam, et al. "A robust machine learning technique to predict low-performing students." ACM Transactions on Computing Education (TOCE) 19.3 (2019): 1-19. (Year: 2019).

Wang, Yen-Zen. "Using genetic algorithm methods to solve course scheduling problems" Expert Systems with Applications 25.1 (2003): 39-50. (Year: 2003).

Burke, Hybrid Recommender Systems: Survey and Experiments User Modeling and User-Adapted Interaction, 2002, pp. 1-30 (Year: 2002).

De Pessemier, Social Recommendations for Events, Ghent University, 2013, pp. 1-4 (Year: 2013).

Herzog, Spontaneous Event Recommendations on the Go, DMRS, 2015, pp. 1-4 (Year: 2015).

Wang, Enhanced Group Recommender System and Visualization, Doctoral Thesis, University of Technology Sydney, 2016, pp. 1-190 (Year: 2016).

\* cited by examiner

Academic Risk 302

Learner Risk Factors
- 20 Academic Standing
- 26 GPA
- 50 Credit Drops
- +Add ◇Change

Engagement Risk Factors 304
- 10 Competing Demand
- 51 Task Engagement
- 36 Undeclared Major
- +Add ◇Change

Readiness Risk Factors 306
- 15 Low HS GPA
- 20 Entry Test Scores
- 44 1st Generation
- +Add ◇Change ◉ All (15)  ● High (4)  ◉ Med (8)  ◉ Low (3)

Paz Centeno 314
Freshman
BS Nursing
Top Risk Factor Engagement 318
Overall / Major GPA  3.5 / 3.0  320
Completed / Degree Hours  15 / 4
Academic Risk [High]

Tom Daws
Sophomore
BS Nursing
Top Risk Factor Engagement
Overall / Major GPA  2.9 / 2.0
Completed / Degree Hours  30 / 0
Academic Risk [High]

Jim McKendree 314
Junior
LS Nursing
Top Risk Factor Engagement 318
Overall / Major GPA  3.1 / 2.4
Completed / Degree Hours  44 / 16  322
Academic Risk [High]

Chris Sanchez
Sophomore
BS Nursing
Top Risk Factor Engagement
Overall / Major GPA  3.0 / 0.0
Completed / Degree Hours  12 / 0
Academic Risk [High] 324

STUDENT RETENTION SYSTEM

BENEFIT CLAIM; RELATED APPLICATION; INCORPORATION BY REFERENCE

This application claims the benefit of U.S. Provisional Patent Application No. 62/566,360, filed Sep. 30, 2017, which is hereby incorporated by reference.

TECHNICAL FIELD

The present disclosure relates to a student retention system. In particular, the present disclosure relates to a student retention system that helps identify and retain students in educational institutions.

BACKGROUND

Student retention involves keeping students enrolled at an educational institution through completion of an academic goal. Retaining students may include taking efforts to prevent students from dropping out and/or transferring from the academic institution to other academic institutions or trade schools. College administrators try to improve graduation rates and decrease a loss of tuition revenue from students that either drop out or transfer to another school.

Universities are creating a number of new retention programs for students at risk of dropping out or transferring to another school. The retention programs help keep at-risk students engaged in classes and involved on campus. The retention programs include, for example, campus-funded tutoring, freshman seminar courses, and intramural sports. Students that are involved in retention programs have a higher rate of retention than students that are not involved in the retention programs. When a student participates in a retention program, the student forms both social and emotional ties to the university. These ties both encourage the student to perform well academically and reduce the chance that the student will drop out of school entirely or leave for another university.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. STUDENT RETENTION SYSTEM
3. RETENTION INTERFACE
   A. STUDENT-POPULATION VIEW
   B. RISK-CATEGORY VIEW
   C. INDIVIDUAL-PROFILE VIEW
4. IDENTIFYING AND PRESENTING AT-RISK STUDENTS
5. MISCELLANEOUS; EXTENSIONS
6. HARDWARE OVERVIEW

1. General Overview

Some embodiments include a student retention system for managing at-risk students. A student, at a particular educational institution, may be considered at-risk if the student is likely to drop out of the educational institution or transfer to a different educational institution. The student retention system includes a student risk analyzer for identifying at-risk students. The student retention system further includes a student retention interface for presenting information corresponding to at-risk students.

Some embodiments classify students into risk categories. Risk categories may be computed as a function of a risk score for a student. The risk score for a student may be based on a combination of factors. As an example, the risk score may be based on a combination of grades, involvement in university programs, social relationships, history at prior educational institutions, family educational background, similarity to other students that have dropped out, and similarity to other students that have successfully graduated from the educational institution. As another example, the risk score for a student may be based on a similarity between (a) attributes of the student and (b) attributes of students that have previously dropped out or transferred to other institutions. Alternatively, or additionally, the risk score may be inversely proportional to a similarity between (a) the attributes of the student and (b) the attributes of students that have graduated from the university. Based on the risk score, the student risk analyzer may identify a risk category for a student. As an example, the student risk analyzer may divide students into three categories based on the risk score: a low-risk category, a medium-risk category, and a high-risk category.

Some embodiments include a student retention interface that displays risk information for students in aggregate form or individual form. The student retention interface may display student information, in a student-population view, a risk-category view, and an individual-profile view. The student retention interface may allow for drill-down navigation between the student-population view, the risk-category view, and the individual-profile view. A student-population view may include, for example, a display of aggregate information corresponding to a subset of students or all students identified in a student database. A risk-category view may display a list of students in a particular risk category. The risk-category view may further include a type of risk, or one or more risk factors contributing to a risk score for a student in the list of students. An individual-profile view may display detailed information about a particular individual. As an example, the individual-profile view may display the student's class load, certifications, programs, and attendance records.

This Specification may describe, and/or the claims may recite, embodiments beyond those that are specifically included in this General Overview section.

2. Student Retention System

Figure 1:
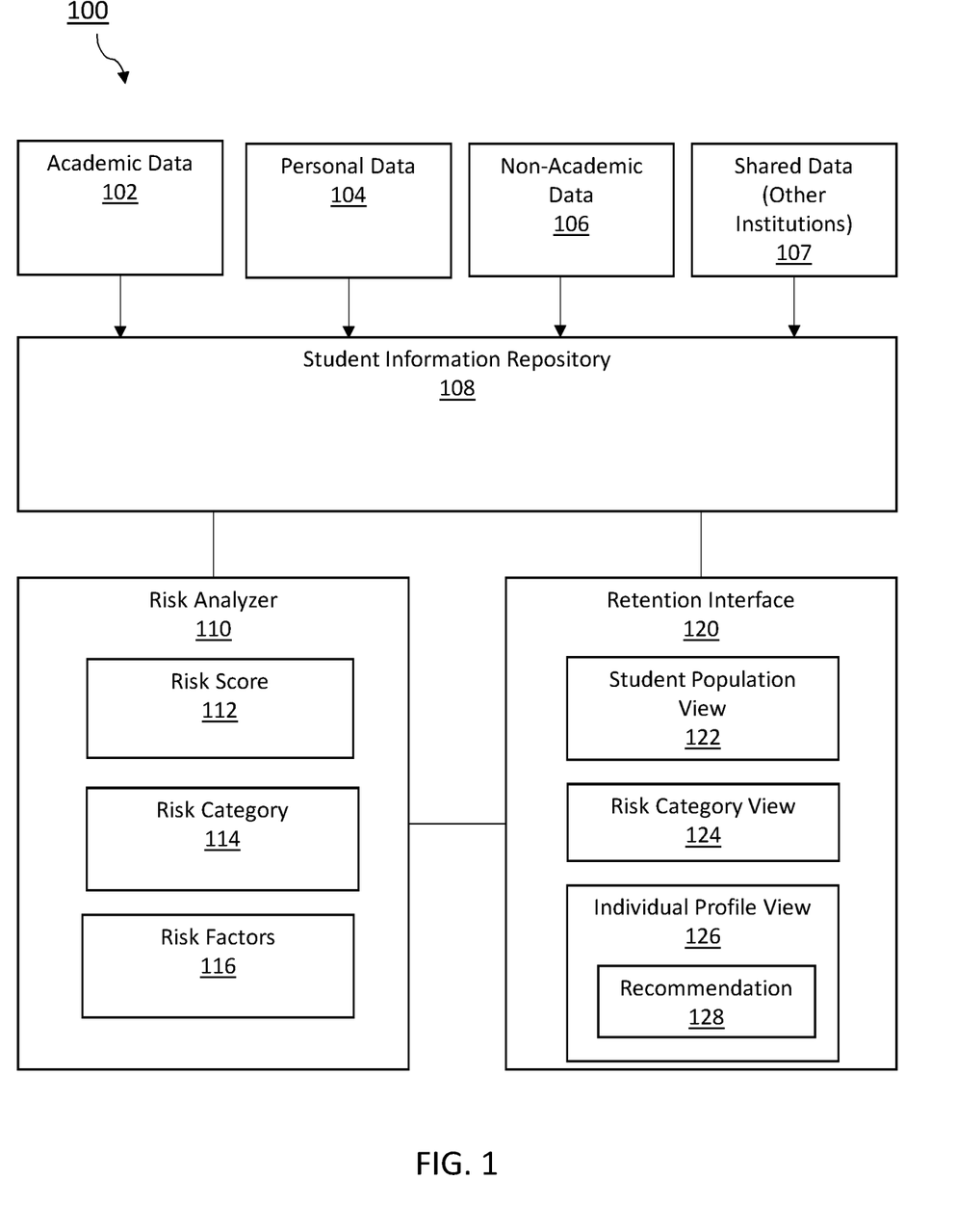
FIG. 1 illustrates a system in accordance with one or more embodiments.

FIG. 1 illustrates a student retention system 100 in accordance with one or more embodiments. As illustrated in FIG. 1, the student retention system 100 includes a student information repository 108, a risk analyzer 110, and a retention interface 120. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In an embodiment, the student information repository 108 is any type of storage unit and/or device (e.g., a file system, collection of tables, or any other storage mechanism) for storing student information. Further, student information repository 108 may include multiple different storage units and/or devices. The multiple different storage units and/or devices may or may not be of the same type or located at the same physical site. Further, the student information repository 108 may be implemented or may execute on the same computing system as the risk analyzer 110 and the retention interface 120. Alternatively, or additionally, the student information repository 108 may be implemented or executed on a computing system separate from the risk analyzer 110 and the retention interface 120. The student information repository 108 may be communicatively coupled to the risk analyzer 110 and the retention interface 120 via a direct connection or via a network.

In an embodiment, the student information repository 108 is populated with student information from a variety of sources and/or systems. The student information repository 108 may include a variety of data related to students, such as academic data 102, personal data 104, non-academic data 106, and shared data from other institutions 107.

In an embodiment, the student information repository is populated with academic data 102. The academic data 102 may include information about a student's prior or current courses such as admission information, grades, enrollment status, class size, attendance, professors, and major. The academic data 102 may include feedback, participation scores, and/or evaluations. As an example, the academic data 102 may include a narrative evaluation of a student's performance in a capstone project. The academic data 102 may include a graduation date for prior students. The academic data 102 may include an anticipated graduation date for current students. The student information repository 108 may be connected with a records department of a university for updating academic data 102.

In an embodiment, the student information repository 108 may be connected with a social network, an Internet Service Provider, or an email service that may have access to a student's personal data 104. The student's personal data 104 may include the student's entity affiliations, personal connections, browsing history, and past events. The student retention system 100 may obtain such personal data, possibly subject to student approval.

In an embodiment, the student information repository 108 may be populated with non-academic data 106 from non-academic departments of the institution. As an example, the non-academic data 106 may include housing data such as whether a student lives on campus or off campus. The non-academic data may include general surveys from the institution. As an example, students matriculating at the university may complete surveys describing the students' interests. The non-academic data 106 may include student service requests, student card system data, and/or parking system data for a student. The non-academic data 106 may include other in-person or online interaction with the institution.

In an embodiment, the student information repository 108 may include shared data 107. The shared data 107 may include, for example, a student's high school grades, college entrance examination scores, or grades at another higher-education institution. Shared data 107 may be shared by other institutions associated with the student. The other institutions may include educational or non-educational institutions with student information. The educational institution, currently attended by the student, may have data-sharing relationships with the other institutions associated with the student.

In one or more embodiments, the risk analyzer 110 determines risk information for a student based on student information stored in the student information repository 108. The risk information may include a risk score 112 and a risk category 114.

Risk information for a student may include student attributes obtained from the student information repository 108. As examples, student attributes, obtained from the student information repository, may include grades, involvement in university programs, social relationships, history at prior educational institutions, family educational background, gender, age, and geographical location. The student attributes may correspond to current students. The student attributes may further correspond to historical data about prior students.

In some embodiments, the risk analyzer 110 may analyze historical data about prior students to compute historical student statistics. The historical student statistics may include historical student retention statistics, historical student application statistics, historical student acceptance statistics, and/or historical student enrollment statistics.

Based on the student attributes, the risk analyzer 110 calculates a risk score 112 for a student. The risk score 112 may be calculated using a machine-learning model trained with historical student attributes. The risk analyzer 110 may define a student to be at-risk if the student is at risk of dropping out of the educational institution. Alternatively, or additionally, the risk analyzer 110 may define a student to be at-risk if the student is at risk of transferring out of the educational institution. The risk score 112 may be a numerical representation of a student's likelihood of dropping out and/or transferring. The risk analyzer 110 may compute a risk score 112 for a student as a similarity score between (a) the attributes of the student and (b) the attributes of students that have previously dropped out or transferred to different universities. Alternatively, or additionally, the student risk analyzer may compute a risk score that is inversely proportional to a similarity score between (a) the attributes of the student and (b) the attributes of students that have graduated from the university. The risk analyzer 110 may compare current and prior students in a same educational program. As an example, the risk analyzer 110 analyzes attributes of current students in a nursing program, in light of attributes of historical students that were enrolled in the nursing program.

The risk score 112 may be based on one or more risk factors 116. Risk factors 116 are attributes that may contribute to a student's at-risk status. As examples, risk factors may include a student's academic standing, Grade Point Average (GPA), and entrance test scores. Risk factors 116 may be a subset of student attributes. As an example, attributes including GPA, gender, and age are used to calculate a risk score 112 for a student. GPA tends to correlate with risk. Gender and age do not tend to correlate with risk. Accordingly, of the three attributes, GPA is a risk factor 116.

In an embodiment, the risk analyzer 110 uses a student's risk score 112 to assign a risk category 114 to a student. The risk category 114 may correspond to a student's level of risk (e.g., high-risk, medium-risk, or low-risk). The risk category 114 may be a direct function of a risk score 112. As an example, a risk score of zero to thirty-three may correspond to a low-risk category. A risk score of thirty-four to sixty-six may correspond to a medium-risk category. A risk score of sixty-seven to one hundred may correspond to a high-risk category.

In some embodiments, the risk analyzer 110 may assign a risk classification to a student. The risk classification may relate to one or more risk factors applicable to the student. The risk classification may specify a type of risk most applicable to a student. As examples, risk classifications may include academic risk, readiness risk, and engagement risk. Academic risk may correspond to college grades and/or college attendance below a threshold value. Readiness risk may correspond to high-school grades or entrance examination scores below a threshold value. Engagement risk may correspond to a student with competing demands on the student's time, such as work or sports commitments. Alternatively, or additionally, engagement risk may correspond to task engagement. Task engagement represents a student's level of engagement in academic tasks, which may be determined based on surveys or browsing data. As an example, a student commonly browses non-academic webpages during class, indicating a task engagement issue.

In one or more embodiments, the retention interface 120 displays student information, including risk information. The retention interface 120 may obtain the student information from the student information repository 108 or from the risk analyzer 110. The retention interface may display information that can be viewed by a counselor to identify and communicate with at-risk students.

Different components of the retention interface 120 may be specified in different languages. The behavior of user interface elements is specified in a dynamic programming language, such as JavaScript. The content of user interface elements is specified in a markup language, such as hypertext markup language (HTML) or extensible markup language (XML) User Interface Language (XUL). The layout of user interface elements is specified in a style sheet language, such as Cascading Style Sheets (CSS). Alternatively, retention interface 120 is specified in one or more other languages, such as Java, C, or C++.

The retention interface 120 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a mobile handset, a smartphone, a personal digital assistant ("PDA"), and/or a client device.

In an embodiment, the retention interface 120 includes, is triggered by, or is managed by a virtual assistant. The virtual assistant presents information reactively (in response to a request for the information) or proactively (without a specific request for the information). The virtual assistant may, for example, detect a life event associated with the student such as a major car accident, or a death in the family. The life event may increase the likelihood that the student would drop out from the educational institution. In response to detecting the life event or detecting a significant increase in drop-out risk or transfer risk, the virtual assistant may identify the student to a counselor via the retention interface 120. The virtual assistant may present the detected life event or other factors that should be reviewed by the counselor for determining and addressing the student's needs.

In an embodiment, the retention interface 120 may display information at various levels of granularity. A user can drill down into a set of information displayed by the retention interface 120 to identify further details. As an example, the retention interface may display student information at different levels of granularity in a student-population view 122, a risk-category view 124, and an individual-profile view 126. A user may navigate may between the student-population view 122, the risk-category view 124, and the individual-profile view 126.

A student-population view 122 may include, for example, a display of aggregate information corresponding to a subset of students or all students identified in a student database. The aggregate information may include aggregate risk information that is based on risk information associated with each of a set of students. The student-population view 122 may display information about an institution as a whole. As an example, the student-population view may display trends across years such as a retention rate, an applicant rate, an admission rate, an enrollment rate, and a graduation yield. The student-population view 122 may display a number or percentage of students in each risk category 114.

In response to selection of a particular risk category 114, the retention interface 120 may switch from a student-population view 122 to a risk-category view 124. The risk-category view 124 may display a list of students in the selected risk category. The risk-category view 124 may display information about specific students. The risk-category view 124 may further include a risk classification for each student in relation to one or more risk factors.

The risk-category view 124 may display aggregated information about a subset of students associated with the selected risk category. As an example, the risk-category view 124 may indicate how many students, in a selected risk category, are associated with specific risk factors such as a low GPA, a high number of class drops, competing demands above a threshold value, or low entry test scores.

In response to detecting user selection of a particular student from a set of students displayed in the risk-category view 124, the retention interface 120 may switch from the risk-category view 124 to an individual-profile view 126. The individual-profile view 126 may display additional information about an individual that may not necessarily have been displayed in the risk-category view 124. An individual-profile view 126 may display detailed information about a particular student. As an example, the individual-profile view may display the student's class load, certifications, programs, and attendance.

In an embodiment, the individual-profile view 126 includes recommendations 128 (also referred to herein as recommended actions). The system may determine a recommendation 128 for lowering a student's risk level. As examples, the individual-profile view 126 may display recommendations 128, such as "meet with counselor," or "take preparatory classes." The recommendations 128 may include retention programs, such as extracurricular activities. The recommended action may be determined based on actions which previous students took to lower the students' respective risk levels. A recommendation 128 may be suggested via an email, a text message, a chat message, or another form of communication configured for the student retention system 100.

In an embodiment, one or more views of the student retention system 100 may allow for interaction with a student. As an example, an appointment scheduling tool may include functionality to schedule an appointment with the student. A counselor may schedule a meeting with a student, identified as an at-risk student by the retention interface, directly from within the retention interface. Alternatively, or additionally, the retention interface 120 may be communicatively coupled with a calendaring application for scheduling meetings.

3. Retention Interface

A. Student-Population View

Figure 2:
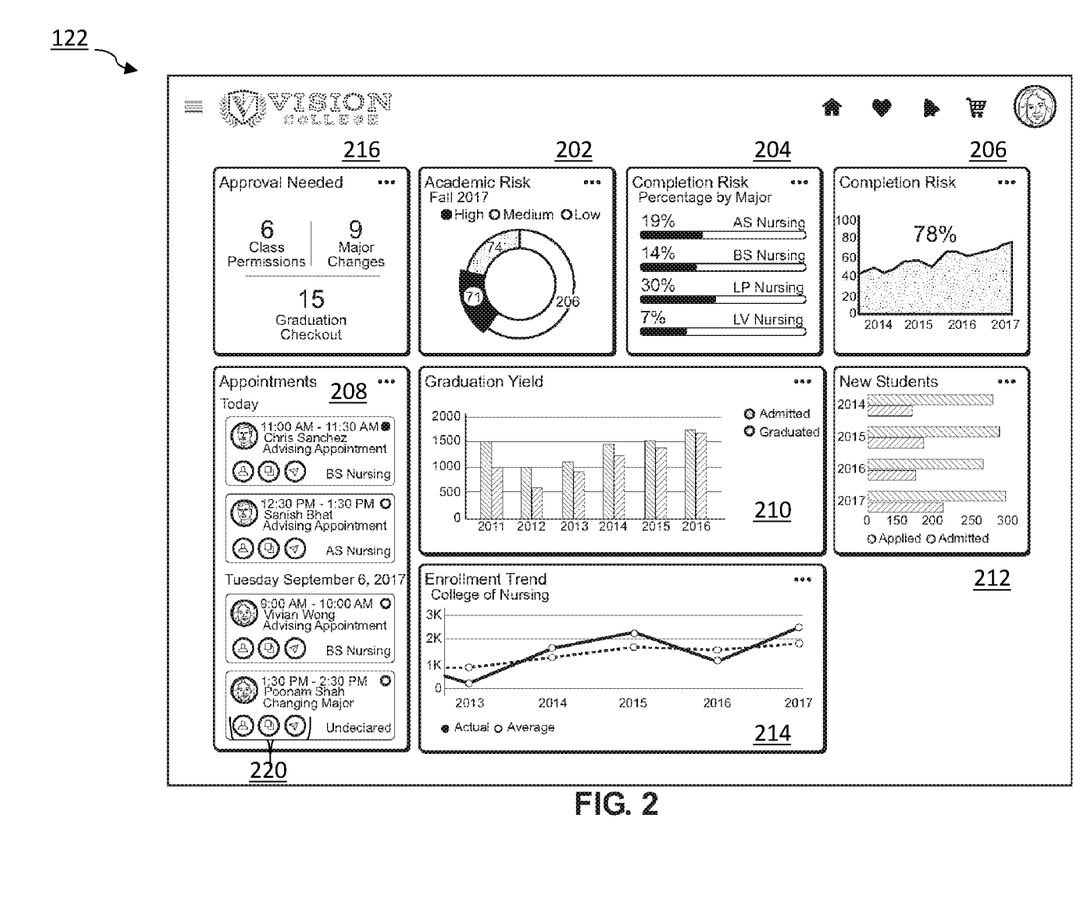
FIG. 2 illustrates a student-population view of a retention interface in accordance with one or more embodiments.

FIG. 2 illustrates an example of a student-population view 122 of a retention interface 120 in accordance with one or more embodiments. Components, operations, and functionality described in relation to this example should not be construed as limiting the scope of any of the claims. Alternative or additional components, operations, and functionality may be implemented in accordance with some embodiments.

The student-population view 122 presents information about the student population at an educational institution as a whole. The student-population view 122 includes an academic-risk chart 202. The academic-risk chart 202 illustrates of a number of students corresponding to each of three risk categories—high-risk, medium-risk, and low-risk. Three risk categories are displayed with color codes. The academic-risk chart 202 shows that, in Fall 2017, there are two hundred six students in the low-risk category, seventy-four students in the medium-risk category, and seventy-one students in the high-risk category.

The student-population view 122 may further include a completion-risk chart 204. The completion-risk chart 204 includes a set of degree programs (e.g., Associate of Science (AS) Nursing and Bachelor of Science (BS) Nursing). Each degree program is displayed with a percentage of students deemed at-risk of not completing the degree program.

The student-population view 122 further displays a completion risk, of the student population as a whole, over time 206. The completion risk corresponds to a risk of not completing an academic program. The completion risk over time 206 is depicted as a graph of completion risk vs time over several years.

The student-population view 122 further includes a depiction of graduation yield 210. The graduation yield is a comparison of the number of students admitted to the number of students graduated. The graduation yield 210 may be depicted as a bar graph illustrating the number of students both admitted and graduated over time.

The student-population view 122 may further include a depiction of student admission rates over time 212. The admission rates 212 may be displayed as a bar graph, showing the number of students that both applied and were admitted to the educational institution, over time.

The student-population view 122 may further include enrollment trends 214. The number of students that enrolled may be displayed as a number of students enrolled at the educational institution vs. time. The enrollment trends may be displayed alongside an average number of students enrolled.

The student-population view 122 may further include a user's tasks or appointments 208. As an example, the student-population view may display upcoming appointments for a retention counselor. The listed appointments may be integrated with links to methods of communication 220. As an example, an appointment with Chris Sanchez may be illustrated with a time of the appointment, a type of the appointment, a link to message Chris, a representation of Chris' risk category, and a link to Chris' detailed profile. The links to methods of communication 220 may include a link to a student profile, a link to send a text message to the student, and/or a link to email the student.

The student-population view 122 may further include tasks to be completed by the counselor 216 such as granting class permissions, approving graduations, and approving changes in students' majors.

B. Risk-Category View

Figure 3:
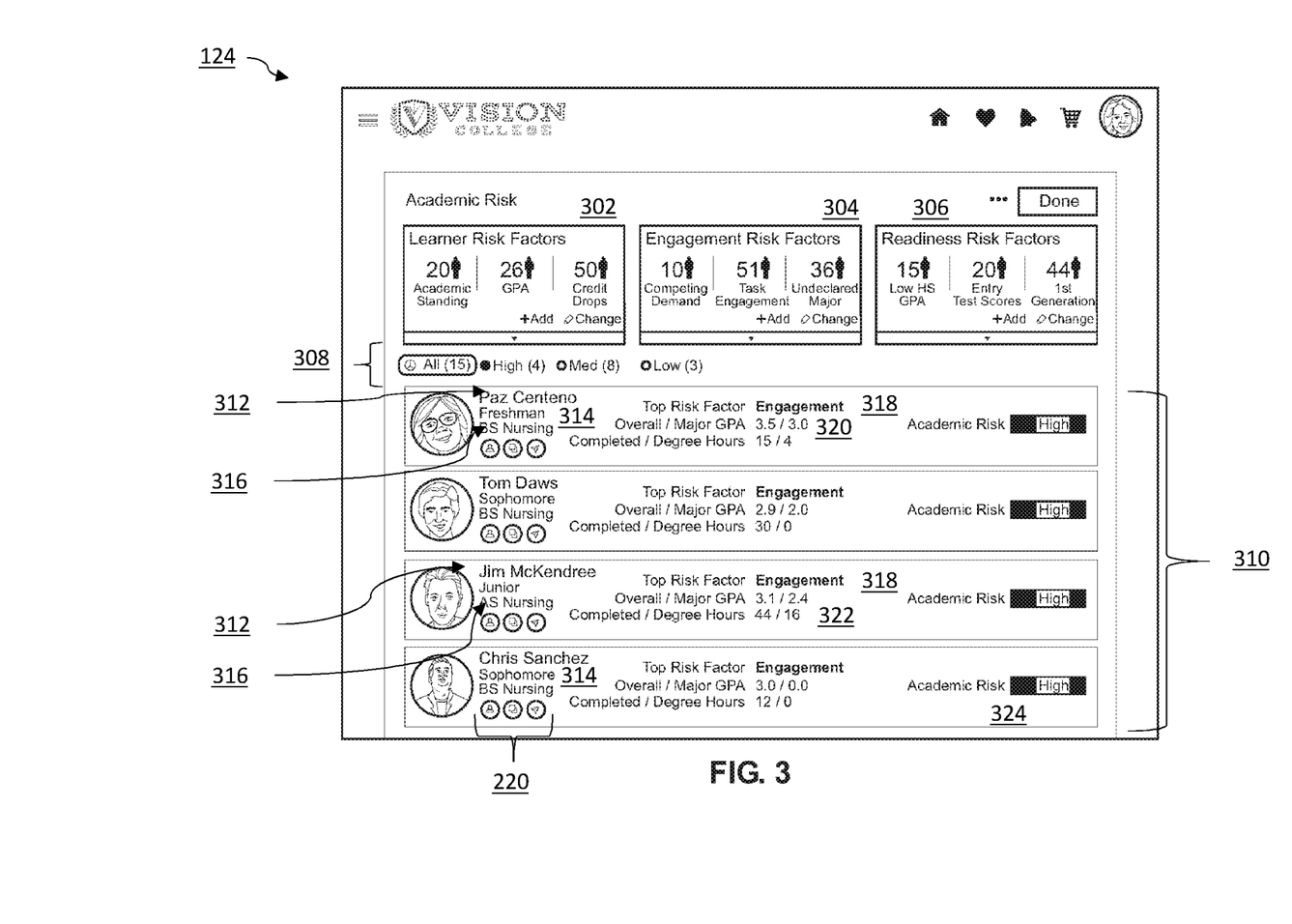
FIG. 3 illustrates a risk-category view of a retention interface in accordance with one or more embodiments.

FIG. 3 illustrates an example of a risk-category view 124 of a retention interface 120 in accordance with one or more embodiments. Components and operations described in relation to this example should not be construed as limiting the scope of any of the claims.

The risk-category view 124 may include information about a subset of students in a particular risk-category. The risk-category view 124 may include elements 308 for accepting user input to switch between risk categories. The user-selectable categories include high-risk, medium-risk, and low-risk. The risk-category view 124 further permits a user to select all risk categories. Responsive to receipt of user input selecting one or more risk categories, the risk-category view 124 may transition to displaying students in the selected risk category.

The risk-category view 124 further displays risk classifications in relation to risk factors. The displayed risk classifications include learner risk, engagement risk, and readiness risk. In the learner risk factors pane 302, the risk-category view displays a number of students associated with each of a set of risk factors related to learner risk. The interface shows that twenty at-risk students have the risk factor academic standing. The students with the risk factor academic standing may, for example, have a GPA below a level corresponding to academic probation (e.g., 2.0). The interface shows that twenty-six at-risk students have the risk factor GPA. Students with the risk factor GPA may have a college GPA below a threshold level historically associated with at-risk students (e.g., 2.5). The interface shows that fifty at-risk students have the risk factor credit drops (e.g., the students dropped more than a threshold number of credits).

In the engagement risk factors pane 304, the risk-category view displays a number of students associated with each of a set of risk factors related to engagement risk. The interface shows that ten at-risk students have the risk factor competing demand. The interface shows that fifty-one at-risk students have the risk factor task engagement. The interface shows that thirty-six at-risk students have the risk factor undeclared major.

In the readiness risk factors pane 306, the risk-category view displays a number of students associated with each of a set of risk factors related to engagement risk. The interface shows that fifteen at-risk students have the risk factor low High School (HS) GPA. Low HS GPA may be determined in view of a threshold HS GPA historically associated with at-risk students (e.g., a GPA of 2.7). The interface shows that twenty at-risk students have the risk factor entry test scores, corresponding to college entry scores below a threshold level. The interface shows that forty-four at-risk students have the risk factor first-generation college students.

The risk-category view 124 includes student profiles 310, for the subset of students in the selected risk category. The student profiles 310 include information about each respective student in the selected risk category. The student profiles 310 include a student's name 312, class standing 314 (e.g., Freshman, Sophomore, Junior, or Senior), and degree program 316. The student profile may include links for contacting the student 220.

In the student profiles, the risk-category view 124 may further display details relating to the student's risk category. The risk-category view 124 may display the risk-category for each student 324 (e.g., high, medium, or low). The risk-category view 124 may display a top risk factor for each student 318 (e.g. engagement, GPA, or academic standing). The risk-category view may display each student's overall and/or major GPA 320. The risk-category view may display each student's completed hours 322.

C. Individual-Profile View

Figure 4:
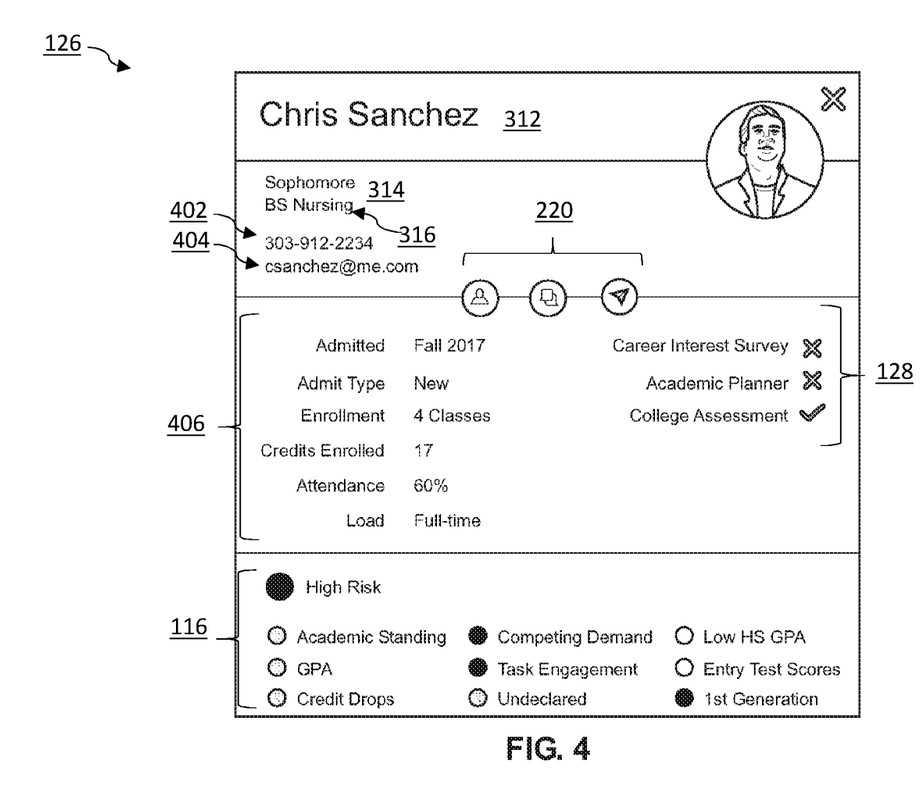
FIG. 4 illustrates an individual-profile view of a retention interface in accordance with one or more embodiments.

FIG. 4 illustrates an example of an individual-profile view 126 of a retention interface 120 in accordance with one or more embodiments. Components and operations described in relation to this example should not be construed as limiting the scope of any of the claims.

The individual-profile view 126 may include information about a target student which is also displayed in the risk-category view 124, including the student's name 312, class standing 314, and degree program 316. The individual-profile view 126 may include links for contacting the student 220. The individual-profile view 126 may further display the student's phone number 402 and email address 404.

The individual-profile view 126 may display additional detail about the student not displayed in the risk-category view or the student-population view. The individual-profile view 126 may include student statistics 406. Student statistics 406 may include the academic term in which the student was admitted to the educational institution (e.g., Fall 2017). Student statistics 406 may include an admit type corresponding to the student (e.g., new or transfer). Student statistics 406 may include a number of classes in which the student is enrolled at the educational institution (e.g., four classes). Student statistics 406 may include a number of credits in which the student is enrolled at the educational institution (e.g., seventeen). Student statistics 406 may include an attendance rate for the student (e.g., sixty percent). Student statistics 406 may include a class load for the student (e.g., full-time or part-time).

The individual-profile view 126 may include a list of recommendations 128 for actions to be completed by the student. As shown in FIG. 4, Chris Sanchez has not completed a career interest survey or academic planner. Chris Sanchez has completed a college assessment. The recommendations 128 may be presented, for at-risk students, as a potential method of lowering the student's risk.

The individual-profile view 126 may include a detailed depiction of risk factors 116 with respect to the target student. The risk factors 116 may be color-coded based on applicability to the target student (e.g., red for major risk factors for the student, yellow for moderate risk factors for the student, and green for risk factors not applicable to the student). As shown in FIG. 4, Chris Sanchez is at high-risk, primarily due to the risk factors competing demand, task engagement, and first generation.

4. Identifying and Presenting at-Risk Students

Figure 5:
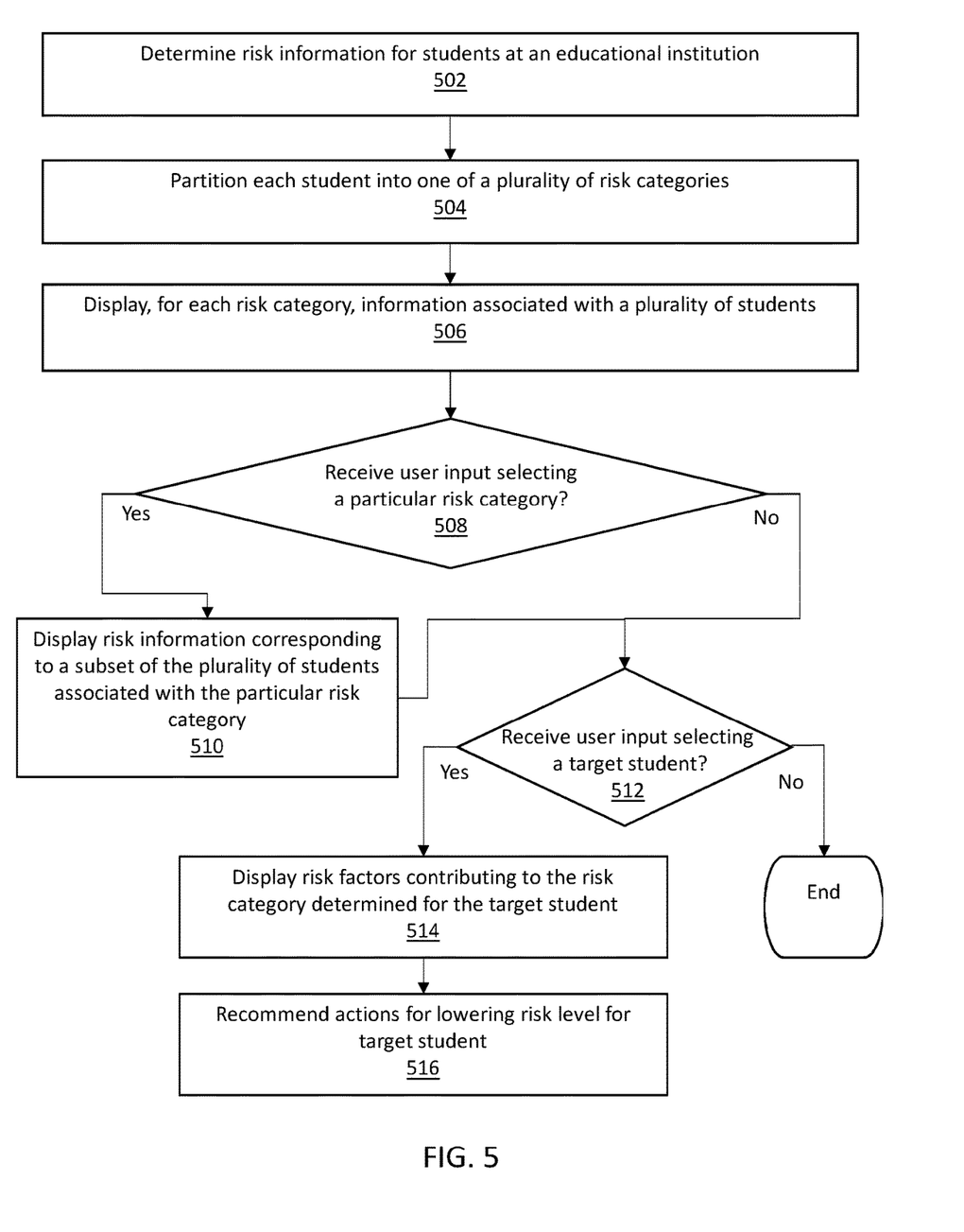
FIG. 5 illustrates operations for identifying and presenting at-risk students in accordance with one or more embodiments.

FIG. 5 illustrates an example set of operations for identifying and presenting at-risk students in accordance with one or more embodiments. One or more operations illustrated in FIG. 5 may be modified, rearranged, or omitted altogether. Accordingly, the particular sequence of operations illustrated in FIG. 5 should not be construed as limiting the scope of one or more embodiments.

In an embodiment, the risk analyzer determines risk information for students at an educational institution (Operation 502). The risk analyzer may obtain student information, including academic data, personal data, non-academic institution data, and/or shared data from other institutions, from the student information repository. The risk analyzer may use the student information to compute risk information corresponding to a particular student.

In an embodiment, the risk analyzer computes a risk score for a particular student. The risk analyzer may compute a risk score, for a particular student, using a machine-learning model. The risk analyzer may train the machine-learning model with historical data corresponding to prior students. The risk analyzer may identify prior students that did, or did not, drop out or transfer from the academic institution. The risk analyzer may identify attributes associated with the prior students. As examples, the attributes may include grades, involvement in programs, social relationships, history at prior educational institutions, and family educational background. The risk analyzer may compute a risk score for a particular student, based on attributes shared between the particular student and prior students.

In an embodiment, the risk score for a particular student may be based on a number or percentage of prior students that graduated from the educational institution. Alternatively, or additionally, the risk score for a particular student may be based on a number or percentage of students that dropped out of the educational institution. As an example, a student, Chris Sanchez, is assessed a risk score of 80/100, based on similar attributes to prior students that dropped out of the educational institution. Seventy-five percent of students that dropped out had GPAs below 2.8. Fifty-five percent of students that dropped out were first-generation college students. Eighty-six percent of students that dropped out exhibited signs of low engagement. Chris Sanchez has a GPA below 2.8, is a first-generation college student, and exhibits signs of low engagement. Based on the similarity between attributes of Chris Sanchez and attributes of students that dropped out, Chris Sanchez is assessed the risk-score of eighty. Alternatively, or additionally, the risk score for the particular student may be based on a number or percentage of the set of prior students that transferred away from the educational institution. The risk score may be incremented based on traits shared with students that left the academic institution. The risk score may be decremented based on traits shared with students that graduated from the academic institution or otherwise completed an academic goal at the academic institution.

In an embodiment, risk analyzer may modify the model used for computing the risk score based on the availability of student information. The risk analyzer may include or exclude student attributes, based on the availability of student information at a given time. As an example, a formula used for computing risk information may be modified to include or exclude student attributes such as GPA or academic standing. During an academic term, the GPA for a particular student is not available. Accordingly, the risk score formula does not include the student's GPA for that term. At the end of the term, the GPA for that term is available. Accordingly, the risk score formula is modified to include the student's GPA for that term.

In an embodiment, the risk analyzer partitions each student into one of a plurality of risk categories (Operation 504). The risk analyzer may assign a risk category to a particular student based on the student's risk score. As an example, the risk analyzer assigns risk scores ranging from one to one hundred. The risk analyzer assigns students with risk scores of seventy and above to a high-risk category. The risk analyzer assigns students with risk scores between forty and sixty-nine to a medium-risk category. The risk analyzer assigns students with risk scores between one and thirty-nine to a low-risk category. Alternatively, or additionally, the risk analyzer may assign a particular student a risk category and/or risk classification based on specific attributes. As an example, students with GPA below 3.1 are assigned to the risk category "high academic risk." Students with more than ten absences are assigned to the risk category "high attendance risk."

In an embodiment, the retention interface displays, for each risk category, information associated with a plurality of students (Operation 506). The retention interface may display a student-population view comprising information about the student population as a whole, with respect to one or more risk categories. The retention interface may show a number of students in each of a set of risk categories. As an example, the retention interface displays three risk categories, high-risk, medium-risk, and low-risk. The retention interface displays a number of students corresponding to each risk category. The retention interface may further display student attributes in relation to the risk categories. As an example, the retention interface displays a number of high-risk students in each of a set of degree programs— seventy high-risk students in the BS Nursing program, forty high-risk students in the AS Occupational Therapy program, and ten high-risk students in the Master of Science (MS) Occupational Therapy program.

In an embodiment, the retention interface allows for user input selecting a particular risk category (Operation 508). The retention interface may present user-selectable elements corresponding to each risk category. As an example, the retention interface displays the name of each of three risk categories—high, medium, and low. The name of each risk category can be selected by a user. Responsive to detecting user selection of a particular risk category, the retention interface may transition from the student-population view to the risk-category view.

In an embodiment, the retention interface displays risk information corresponding to a subset of the plurality of students associated with the particular risk category (Operation 510). The retention interface may display student profiles corresponding to the subset of students associated with the particular risk category. The student profiles may include details about each student, such as name, class standing, and GPA.

In an embodiment, the retention interface allows for user input selecting a target student (Operation 512). The retention interface may present user-selectable elements for selection of a target student. As an example, the retention interface displays a list of students. The name of each student can be selected. Responsive to receiving user selection of a target student, the retention interface may transition from the risk-category view to the individual-profile view.

In an embodiment, the retention interface displays risk factors contributing to the risk category determined for the target student (Operation 514). The retention interface may display one or more risk factors for the student. As an example, the retention interface displays the top risk factor, GPA, for the target student, labeled "Top Risk Factor: GPA." Alternatively, or additionally, the retention interface may display a list of risk factors for the target student. The risk factors may be displayed differently, depending on a level of applicability to the target student. As an example, the retention interface displays ten risk factors for a target student. The four risk factors that most contributed to the target student's risk category are displayed in a different color than the remaining six risk factors.

In an embodiment, the retention system recommends actions for lowering the risk level for the target student (Operation 516). As an example, the retention system may recommend that students that completed fewer than a threshold number of math courses should enroll in a math development class prior to the first semester at the institution. The retention system may recommend actions based on previously successful strategies. The retention system may identify a recommendation action based on data corresponding to previous students.

In an embodiment, the retention system schedules an appointment with a student. The retention system may display user interface elements for scheduling an appointment with a student. Responsive to receiving user input to schedule an appointment, the retention system may schedule the appointment with the student. As an example, the retention system identifies an at-risk student, John Smith. The retention system displays, to a counselor, a modal including the text "Schedule Appointment with John Smith?" and buttons labeled "Yes" and "No." Responsive to receipt of user input selecting the "Yes" button, the retention system uses a calendar application to identify an available time for the counselor. The retention system transmits an email to John Smith, to invite John Smith to an appointment with the counselor during the available time.

The following detailed example illustrates operations in accordance with one or more embodiments. The following detailed example should not be construed as limiting the scope of any of the claims. The risk analyzer determines risk information for a plurality of students at an educational institution, Vision College. The risk analyzer uses historical student information corresponding to prior students that attended Vision College to identify characteristics that are associated with at-risk students. The risk analyzer classifies prior students that dropped out of Vision College or transferred to a different institution as at-risk. The risk analyzer uses a machine-learning model for calculating a risk score for each student, of a plurality of current Vision College students. The risk analyzer uses a formula to calculate the risk score for each student. The formula is a function of GPA, academic standing, credit drops, competing demand from non-academic activities, high-school GPA, and declared major. The risk analyzer further identifies risk factors that contributed most to the risk score for each student.

Based on the risk score for each student, the risk analyzer partitions each student into one of three risk categories—high, medium, and low. The risk analyzer assigns the risk categories based on each student's respective risk score. The risk analyzer identifies two hundred students categorized as low-risk, seventy-five students categorized as medium-risk, and sixty students categorized as high-risk.

The retention interface displays aggregated student information in the student-population view. The student-population view includes information about the student body at the institution overall. The student-population view displays completion risk by major. The student-population view displays the three risk categories—high-risk, medium-risk, and low-risk. For each risk category, the student-population view displays the number of students in the risk category.

The retention interface receives user input selecting the high-risk category. A counselor at Vision College clicks on "High Risk" on the student-population view of the retention interface. Responsive to receiving the user input selecting high-risk, the retention interface transitions from the student-population view to the risk-category view.

In the risk-category view, the retention interface displays risk information for students in the high-risk category. The retention interface displays details about each student in the high-risk category, such as name, class standing, major, and GPA. Additionally, the retention interface displays the top risk factor for each student.

The retention interface receives user input selecting a target student. The counselor clicks on the name of a student, Tom Daws. Responsive to receiving the user input selecting Tom Daws, the retention interface transitions from the risk-category view to the individual-profile view.

In the individual-profile view, the retention interface displays detailed information about the target student. The retention interface shows Tom Daws's contact information. The retention interface displays a set of recommended actions, noting whether each of the recommended actions has been completed. The retention interface shows that Tom Daws has completed a career interest survey but has not completed an academic planner. The retention interface further displays a set of risk factors for Tom Daws. The retention interface shows that Tom Daws is at high-risk based on Tom Daws's GPA and task engagement. The retention interface shows that other risk factors, including high-school GPA and academic standing, do not contribute to Tom Daws's high-risk status.

The retention interface receives input, from the counselor, selecting the recommended action "academic planner." Responsive to receiving the user input, the system transmits an email to Tom Daws, prompting Tom Daws to create an academic plan.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
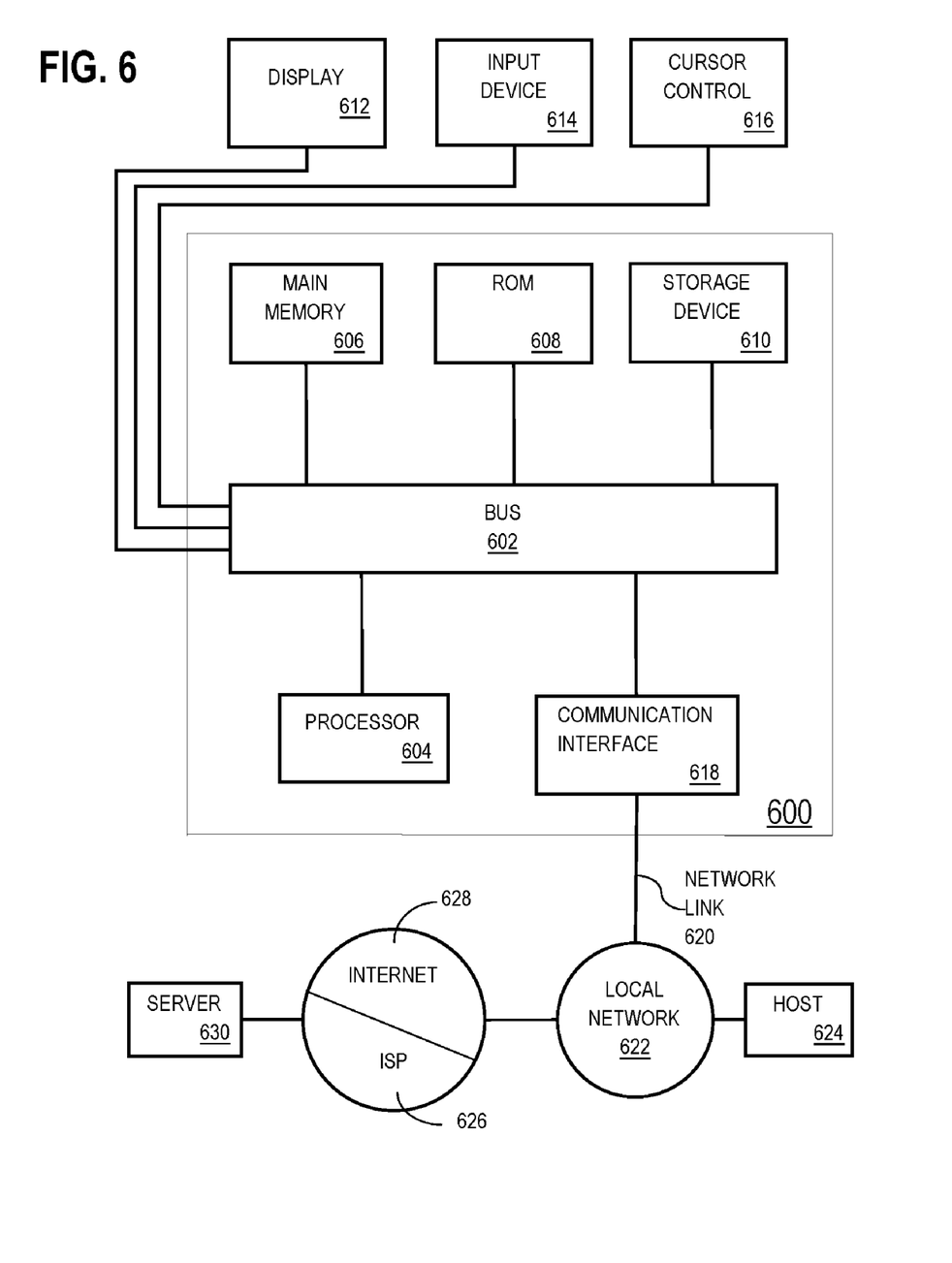
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated-services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 560 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   determining, for each particular student of a plurality of students at an educational institution, risk information corresponding to one or more of: a risk of the particular student dropping out of the educational institution or a risk of the particular student transferring to a different educational institution;
   wherein the risk information is determined using a machine-learning model trained with historical data associated with prior students;
   wherein determining the risk information for a target student of the plurality of students comprises:
      identifying at least a subset of the prior students that share one or more attributes with the target student;
      determining a risk score for the target student based on (a) a number or percentage of the subset of prior students that graduated from the educational institution or (b) a number or percentage of the subset of prior students that dropped out or transferred away from the educational institution;
   based on the risk information, categorizing each particular student of the plurality of students into a respective risk category of a plurality of risk categories corresponding to risks of the plurality of students dropping out of the education institution or transferring to a different educational institution;
determining respective risk category information corresponding to each risk category, of the plurality of risk categories, based on a respective subset of the plurality of students in each risk category;
concurrently displaying, for each of the plurality of risk categories, the respective risk category information;
receiving user input selecting a particular risk category of the plurality of risk categories that are displayed;
responsive to receiving the user input, concurrently displaying respective student information corresponding to each of two or more students in a particular subset of the plurality of students categorized into the particular risk category.

2. The medium of claim 1, wherein the respective risk category information comprises a number of students in the respective subset of the plurality of students in each risk category.

3. The medium of claim 1, wherein the respective risk category information comprises one or more of: historical student retention statistics, historical student application statistics, historical student acceptance statistics, or historical student enrollment statistics.

4. The medium of claim 1, wherein the respective risk category information comprises aggregated student information, for students in a same educational program, in relation to each of the plurality of risk categories.

5. The medium of claim 1, wherein the respective student information corresponding to each of the two or more students in the particular subset of the plurality of students categorized into the particular risk category comprises one or more of:
a number of students, within the particular subset of students, that are classified as at-risk in relation to a particular risk factor;
student profiles of students, within the particular subset of students, that are classified as at-risk in relation to a particular risk factor; or
a risk classification for each student, within the particular subset of students, in relation to the particular risk factor.

6. The medium of claim 1, wherein the operations further comprise:
determining the risk score for the target student using the machine-learning model trained with the historical data associated with the prior students;
categorizing the target student into the particular risk category based on the risk score.

7. The medium of claim 1, wherein the operations further comprise: modifying the attributes used for computing the risk score for the target student based on availability of student information corresponding to the attributes.

8. The medium of claim 1, wherein the attributes include one or more of: grades, involvement in programs, social relationships, history at prior educational institutions, and family educational background.

9. The medium of claim 1, wherein:
the respective risk category information comprises a number of students in the particular subset of the plurality of students;
the respective risk category information comprises one or more of: historical student retention statistics, historical student application statistics, historical student acceptance statistics, historical student enrollment statistics, or aggregated student information, for students in a same educational program, in relation to each of the plurality of risk categories;
the respective student information corresponding to each of the two or more students in the particular subset of the plurality of students categorized into the particular risk category comprises one or more of:
a number of students, within the particular subset of students, that are classified as at-risk in relation to a particular risk factor;
student profiles of students, within the particular subset of students, that are classified as at-risk in relation to a particular risk factor; or
a risk classification for each student, within the particular subset of students, in relation to the particular risk factor;
the operations further comprise:
determining the risk score for the target student using the machine-learning model trained with the historical data associated with the prior students;
categorizing the target student into the particular risk category based on the risk score;
wherein the risk score is determined at least by:
identifying a subset of the prior students that share one or more attributes with the target student;
determining a risk score for the target student based on (a) a number or percentage of the subset of prior students that graduated from the educational institution or (b) a number or percentage of the subset of prior students that dropped out or transferred away from the educational institution;
modifying the attributes used for computing the risk score for the target student based on availability of student information corresponding to the attributes;
wherein the attributes include one or more of: grades, involvement in programs, social relationships, history at prior educational institutions, and family educational background;
receiving second user input selecting target student from the particular subset of the plurality of students categorized into the particular risk category;
responsive to receiving the second user input, displaying an interface that identifies risk factors that contributed to categorizing the target student into the particular risk category;
wherein displaying the interface that identifies the contributing risk factors comprises displaying a visualization that identifies the contributing risk factors from a plurality of risk factors that were analyzed to compute the risk information;
determining a recommended action to lower one or more of: the risk of the target student dropping out of the educational institution or the risk of the target student transferring to the different educational institution;
displaying the recommended action;
wherein the recommended action is identified based on actions, taken by previous students, which lowered risk levels for the previous students;
displaying user interface elements for scheduling an appointment with the target student;
accepting user input to schedule the appointment;
scheduling the appointment with the target student; and
displaying the risk score for each of the plurality of students.

10. A non-transitory computer readable medium comprising instructions which, when executed by one or more hardware processors, causes performance of operations comprising:

determining, for each particular student of a plurality of students at an educational institution, risk information corresponding to one or more of: a risk of the particular student dropping out of an educational institution or a risk of the particular student transferring to a different educational institution;

wherein the risk information is determined using a machine-learning model trained with historical data associated with prior students;

determining, for each particular student of the plurality of students at the educational institution, a respective subset of a set of risk factors that are most applicable;

concurrently displaying, for each of the plurality of students, respective student information and the respective subset of the set of risk factors that are most applicable.

11. The medium of claim 10, wherein concurrently displaying the respective subset of the set of risk factors comprises displaying a visualization that identifies the respective subset of the set of risk factors from a plurality of risk factors that were analyzed to compute the risk information.

12. The medium of claim 10, wherein the operations further comprise:

determining a recommended action to lower one or more of: the risk of the target student dropping out of the educational institution or the risk of the target student transferring to the different educational institution; and displaying the recommended action.

13. The medium of claim 12, wherein the recommended action is identified based on actions, taken by previous students, which lowered risk levels for the previous students.

14. The medium of claim 10, wherein the operations further comprise:

displaying user interface elements for scheduling an appointment with the target student;

accepting user input to schedule the appointment;

scheduling the appointment with the target student.

15. The medium of claim 10, wherein concurrently displaying for each of the plurality of students, the respective student information and the respective risk category comprises concurrently displaying a risk score for each of the plurality of students.

16. The medium of claim 10, wherein a risk score for a target student of the plurality of students is determined at least by:

identifying a subset of the prior students that share one or more attributes with the target student;

determining a risk score for the target student based on (a) a number or percentage of the subset of prior students that graduated from the educational institution or (b) a number or percentage of the subset of prior students that dropped out or transferred away from the educational institution.

17. The medium of claim 16, wherein the attributes include one or more of: grades, involvement in programs, social relationships, history at prior educational institutions, and family educational background.

18. The medium of claim 16, wherein the operations further comprise: modifying the attributes used for computing the risk information for the target student based on availability of student information corresponding to the attributes.

19. A method comprising:

determining, for each of a plurality of students at an educational institution, risk information corresponding to one or more of: a risk of the particular student dropping out of the educational institution or a risk of the particular student transferring to a different educational institution;

wherein the risk information is determined using a machine-learning model trained with historical data associated with prior students;

wherein determining the risk information for a target student of the plurality of students comprises:

identifying at least a subset of the prior students that share one or more attributes with the target student;

determining a risk score for the target student based on (a) a number or percentage of the subset of prior students that graduated from the educational institution or (b) a number or percentage of the subset of prior students that dropped out or transferred away from the educational institution;

based on the risk information, categorizing each of the plurality of students into a respective risk category of a plurality of risk categories corresponding to risks of the plurality of students dropping out of the education institution or transferring to a different educational institution;

determining respective risk category information corresponding to each risk category, of the plurality of risk categories, based on a respective subset of the plurality of students in each risk category;

concurrently displaying, for each of the plurality of risk categories, the respective risk category information receiving user input selecting a particular risk category of the plurality of risk categories that are displayed;

responsive to receiving the user input, concurrently displaying respective student information corresponding to each of two or more students in a particular subset of the plurality of students categorized into the particular risk category;

wherein the method is performed by at least one device including a hardware processor.

* * * * *